(12) United States Patent
Takahashi

(10) Patent No.: US 6,236,541 B1
(45) Date of Patent: May 22, 2001

(54) DISC CARTRIDGE

(75) Inventor: Kenji Takahashi, Miyagi (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 09/298,220

(22) Filed: Apr. 23, 1999

(30) Foreign Application Priority Data

May 11, 1998 (JP) ................................................. 10-127887

(51) Int. Cl.[7] ................................................... G11B 23/03
(52) U.S. Cl. ............................................................ 360/133
(58) Field of Search .............................. 360/133; 369/291

(56) References Cited

U.S. PATENT DOCUMENTS 5,512,111   4/1996  Tahara et al. .

FOREIGN PATENT DOCUMENTS

| 0215958 A1 | 4/1987 | (EP) . |
|---|---|---|
| 0218231 A2 | 4/1987 | (EP) . |
| 0248908 A1 | 12/1987 | (EP) . |
| 0502702 A1 | 9/1992 | (EP) . |
| 0526222 A2 | 2/1993 | (EP) . |
| 0579943 A2 | 1/1994 | (EP) . |

Primary Examiner—Allen T. Cao
(74) Attorney, Agent, or Firm—Oblon, Spivak, McClelland, Maier & Neustadt, P.C.

(57) ABSTRACT

A disc cartridge is provided which comprises a cartridge body having spinnably encased therein a disc and having also formed therein read/write openings through which radially extending portions of main surfaces of the disc are exposed, a shutter member coupled movably to the cartridge body, and a locking member. The shutter member is kept locked to close the read/write openings with a bent engagement lug formed on a sliding guide portion being engaged on the locking member. To reinforce the base portion of the engagement lug, the shutter member has provided thereon a reinforcement portion formed by bending from the sliding guide portion integrally with the engagement lug. Thus, the engagement lug can be prevent from being deformed under a shock, if any, applied to the disc cartridge and the shutter member can positively keep closing the read/write openings.

2 Claims, 6 Drawing Sheets

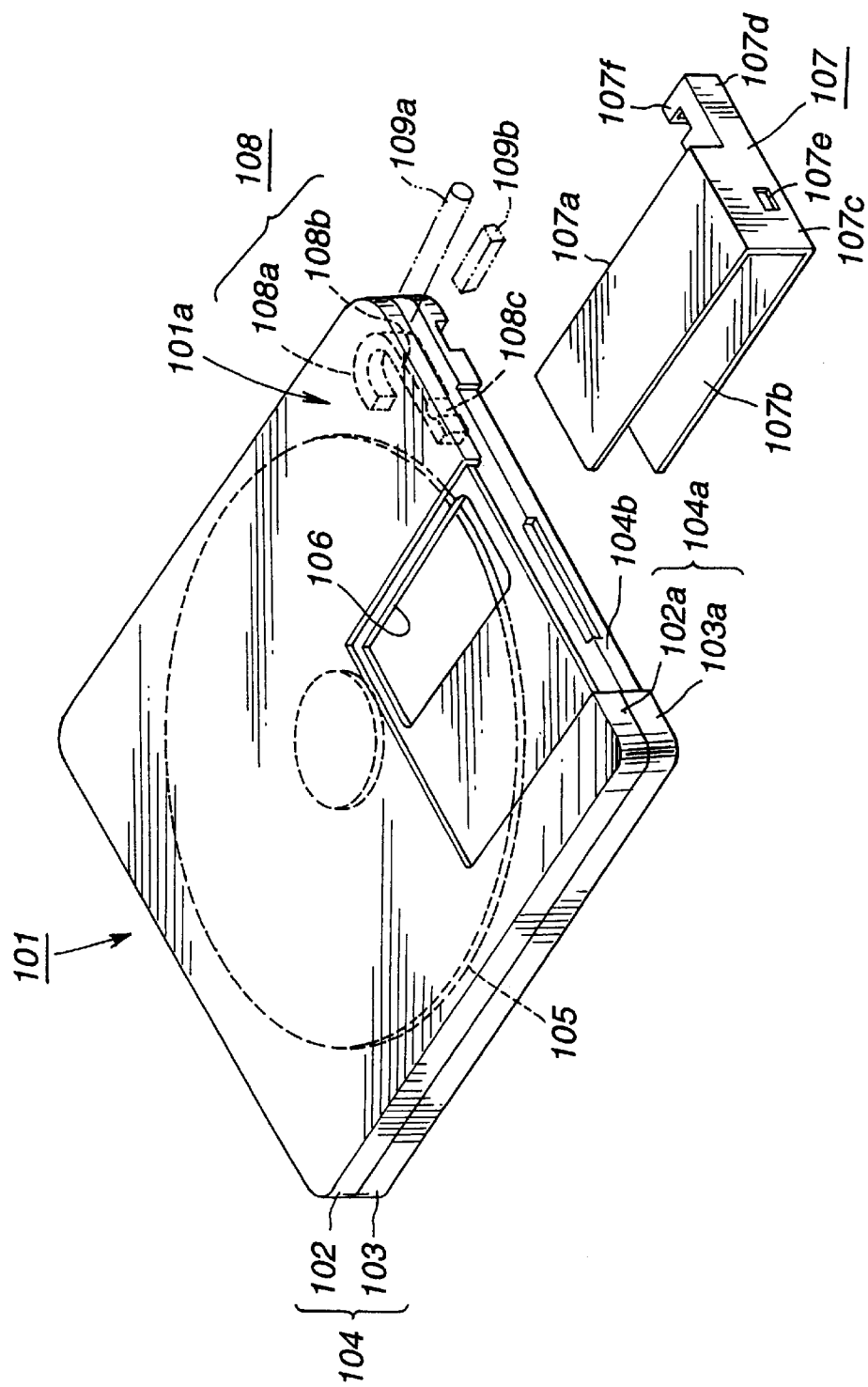
PRIOR ART FIG.1

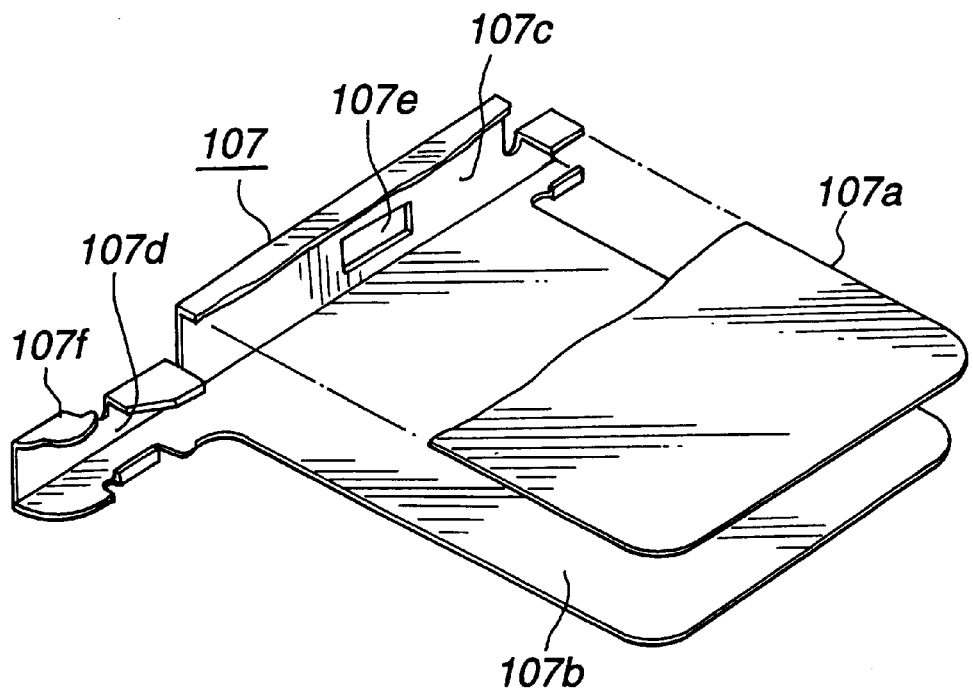
PRIOR ART FIG.2
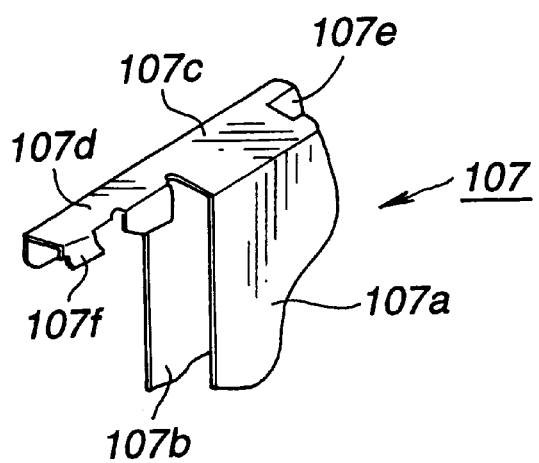
PRIOR ART FIG.3

DISC CARTRIDGE

BACKGROUND OF THE INVENTION

1. Field of the Invention

The present invention relates to a disc cartridge having spinnably encased therein a disc-shaped recording medium such as an optical disc, magneto-optical disc or the like (will be referred to as "disc" hereinunder) to which information signal such as audio signal, video signal or the like can be written or from which recorded information signal can be read.

2. Description of Related Art

FIG. 1 shows a conventional disc cartridge by way of example. The disc cartridge is generally indicated with a reference 101. It has encased therein a disc 105 to which information signal such as an audio, video signal, etc. can be written or from which recorded information signal can be read. As shown, the disc cartridge 101 has a cartridge body 104 formed from a combination of an upper half 102 and a lower half 103. The disc 105 is housed spinnably in a disc compartment formed inside the cartridge body 104. When the disc cartridge 101 is set in a recording/reproducing apparatus (will be referred to as "disc drive" hereinunder), the disc 105 is connected to a disc table of a disc spinning drive and driven to spin.

The cartridge body 104 has read/write openings 106 formed therein. At least portions thereof extending from the lead-in to lead-out of an information recording area of the disc 105 housed spinnably in the disc compartment, are exposed through the read/write openings 106. There is provided on the cartridge body 104 a shutter member 107 which is movable between two positions, open and closed. When the disc cartridge 101 is not used, the shutter member 107 is in the closed position to prevent dust or the like from coming into the cartridge body 104 through the read/write openings 106 and adhering to the surface of the disc 105 in the cartridge 101. When the disc cartridge 101 is used for read or write with respect to the disc 105, the shutter member 107 is moved to the open position. The cartridge body 104 has formed on one side face 104a thereof (will be referred to as "front face" hereinunder) a guide recess 104b in which a shutter opening member 109a of the disc drive is engaged as will be described later.

The shutter member 107 is formed from a thin metallic material such as a stainless steel by punching, bending or cutting. As shown in FIG. 2, the shutter member 107 consists of shutter portions 107a and 107b parallel to each other and corresponding to the read/write openings 106, respectively, formed in the upper and lower halves 102 and 103, and a joint portion 107c. Thus the shutter member 107 has a generally C-shaped section. The shutter member 107 has a sliding guide portion 107d formed integrally at one end of the joint portion 107c and which is to guide the shutter member 107 sliding along the front face 104a of the cartridge body 104.

The joint portion 107c has formed therein an engagement hole 107e in which a shutter closing member 109b of the disc drive is engaged. The sliding guide portion 107d has an engagement lug 107f formed at the free end thereof. The engagement lug 107f is bent from the upper edge of the sliding guide portion 107d to be parallel to the shutter portion 107a. A shutter locking member 108 provided on the cartridge body 104 as will be described later is engaged on the engagement lug 107f. The shutter member 107 constructed as mentioned above is assembled from the front face 104a of the cartridge body 104 for the shutter portions 107a and 107b to extend over the read/write openings 106.

As indicated with dashed lines in FIG. 1, the cartridge body 104 has the shutter locking member 108 disposed at one corner 101a of a front face 103a of the lower half 103 forming the front face 104a. The shutter locking member 108 is made of a synthetic resin. While the shutter portions 107a and 107b are closing the read/write openings 106, respectively, the shutter locking member 108 locks the shutter member 107 at the closed position against an inadvertent movement to open the read/write openings 106.

The shutter locking member 108 consists of a fixed portion 108a formed at the base of the member 108 and which is to be fixed to the lower half 103, a locking arm portion 108b formed integrally with the fixed portion 108a to project and have a generally U-shaped form, and an engagement concavity 108c formed at the free end of the locking arm portion 108b. The locking arm portion 108b is elastically deflectable. The shutter locking member 108 is installed to the lower half 103 for the engagement concavity 108c of the locking arm portion 108b to be opposite to the front face 104a of the cartridge body 104. When the engagement lug 107f of the shutter member 107 is engaged in the engagement concavity 108c of the locking arm portion 108b with the shutter portions 107a and 107b closing the read/write openings 106, the shutter locking member 108 locks the shutter member 107.

In the conventional disc cartridge 101, when the engagement lug 107f of the shutter member 107 is engaged in the engagement concavity 108c of the locking arm portion 108b with the shutter portions 107a and 107b closing the read/write openings 106, the shutter locking member 108 locks the shutter member 107 as mentioned just above. Even if the disc cartridge 101 is applied with a shock by dropping or otherwise careless handling, the read/write openings 106 can be surely closed by the shutter member 107.

The engagement lug 107f of the shutter member 107 is formed by bending horizontally from the upper end of the sliding guide portion 107d towards the cartridge body 104. Thus, if the shutter member 107 is applied with a shock, the engagement lug 107f will possibly be bent inwardly as shown in FIG. 3 as the case may be. In this case, in the disc cartridge 101, the engagement lug 107f is disengaged from the engagement concavity 108c of the shutter locking member 108 so that the shutter member 107 will easily be moved, with the result that the read/write openings 106 will be opened. Dust or the like coming into the cartridge body 104 through the read/write openings 106 thus opened will adhere to the exposed surfaces of the disc 105 which will also be scratched or otherwise damaged.

On the other hand, it has been proposed to provide a disc cartridge 101 having the shutter member 107 molded from aluminum or synthetic resin in order to reduce the manufacturing costs or reduce the weight of the disc cartridge 101. In this case, however, since the shutter member 107 made of such a material is somewhat lower in mechanical strength than the stainless steel-made shutter member 107, the engagement lug 107f is deformable or breakable more easily.

SUMMARY OF THE INVENTION

Accordingly, the present invention has an object to overcome the above-mentioned drawbacks of the prior art by providing a disc cartridge in which even if it is applied with a shock by dropping or otherwise careless handing, the engagement lug can be prevented from being deformed and thus the shutter member can positively keep closing the read/write openings.

The above object can be attained by providing a disc cartridge comprising according to the present invention:

a cartridge body having spinnably encased therein a disc-shaped recording medium and having also formed therein read/write openings through which portions of main surfaces of the disc-shaped recording medium are exposed;

a shutter member coupled movably to the cartridge body and having:

shutter portions to cover the read/write openings;

a joint portion formed integrally with the shutter portions perpendicularly to the latter to be opposite to one lateral face of the cartridge body and having formed therein an engagement hole in which a shutter driving member of a recording/reproducing apparatus; and a sliding guide portion formed integrally with one lateral edge of the joint portion and having an engagement lug formed by bending parallel to the shutter portions; and a locking member disposed inside the cartridge body so as to engage with the engagement lug of the engagement lug with the shutter portions positioned to close the read/write openings, thereby locking the shutter member;

the shutter member having formed integrally therewith a reinforcement portion bent along with the sliding guide portion to reinforce the base of the engagement lug.

In the disc cartridge constructed as mentioned above according to the present invention, the reinforcement member improves the mechanical strength of the engagement lug, so that the engagement lug can be prevented from being deformed due to a dropping shock, if any, applied to the disc cartridge, and being disengaged from the locking member. Therefore, in this disc cartridge, the disc can be prevented from having adhered to the main surfaces thereof dust or the like coming into the disc cartridge from outside through the opened read/write openings or from being scratched or otherwise damaged. Further, also in case the disc cartridge has a shutter member made of aluminum or synthetic resin, for example, the shutter member can be positively kept in locking the shutter member.

These objects and other objects, features and advantages of the present intention will become more apparent from the following detailed description of the preferred embodiments of the present invention when taken in conjunction with the accompanying drawings.

BRIEF DESCRIPTION OF THE DRAWINGS

FIG. 1 is an exploded perspective view of a conventional disc cartridge;

FIG. 2 is a partially fragmentary perspective view of the shutter member provided in the disc cartridge in FIG. 1;

FIG. 3 is a perspective view of the essential portions of the engagement lug formed on the shutter member;

DETAILED DESCRIPTION OF THE PREFERRED EMBODIMENTS

Figure 4:
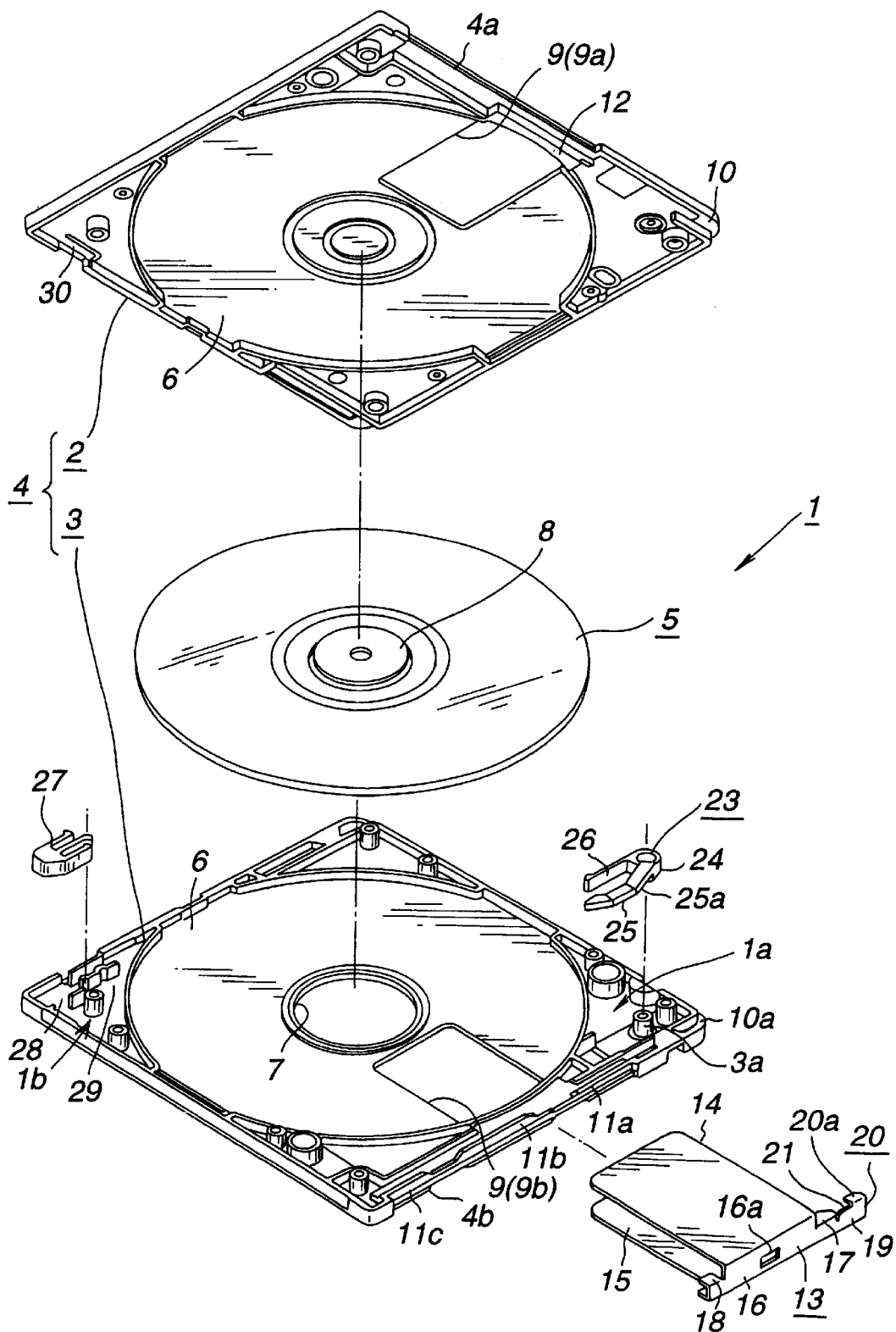
FIG. 4 is an exploded perspective view of a disc cartridge according to the present invention.

Referring now to FIG. 4, there is illustrated an embodiment of disc cartridge according to the present invention. The disc cartridge is generally indicated with a reference 1. As shown, it comprises a combination of an upper half 2 and lower half 3 molded from a synthetic resin or the like to have a generally square dish-like shape and form together a cartridge body 4. The cartridge body 4 has an optical disc 5 encased spinnably in a disc compartment 6 defined by an annular wall formed upright on opposite main surfaces of the upper and lower halves 2 and 3.

The lower half 3 has a circular opening 7 formed therein generally in the center thereof. When the disc cartridge 1 is set in place in a cartridge loader of a recording/reproducing apparatus (will be referred to as "disc drive" hereinunder), a disc table of the drive to drive the optical disc 5 inside the cartridge body 4 faces through the central opening 7 a magnetic clamping metallic disc 8 provided on the optical disc 5 to close a central opening in the optical disc 5 in the cartridge body 4.

The upper and lower halves 2 and 3 have formed therein opposite read/write openings 9 (9a and 9b), respectively, through which at least portions of a signal recording area, extending from the lead-in to lead-out, of the optical disc 5 housed spinnably in the dis compartment 6 are exposed. The read/write openings 9 are formed to have a rectangular shape extending from near the central opening 7 to one side face 33 (will be referred to as "front face" hereinunder) of the cartridge body 4 as shown in FIG. 4. The rectangular read/out openings 9 are positioned generally in the middle of the front side of the cartridge body 4.

Figure 5:
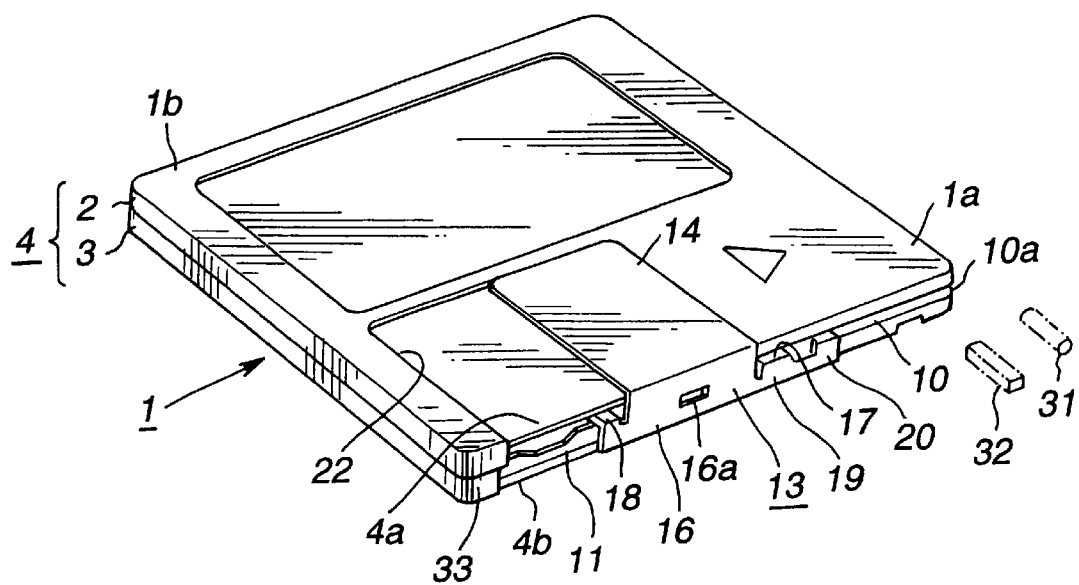
FIG. 5 is a perspective view of the disc cartridge in FIG. 4.

As shown in FIG. 5, the cartridge body 4 has formed in the front face 33 thereof a shutter drive guide recess 10 through which a shutter opening member 31 and shutter closing member 32 will be introduced as will further be described later. The shutter drive guide recess 10 is a horizontal recess open at one side face 10a perpendicular to the front face 33 of the cartridge body 4 and extending over an entire moving direction of a shutter member 13 which will further be described later. The lower half 3 has provided in front of the shutter drive guide recess 10 a guide wall 11 along which the shutter member 13 will be slid stably as will further be described later.

On the other hand, the upper half 2 has an abutment wall 12 provided inside the shutter drive guide recess 10. The abutment wall 12 is positioned inside the front edge of the read/write opening 9. When put in abutment with the inner wall of the lower half 3, it works with the inner wall of the lower half 3 to prevent the cartridge body 4 from being deflected at the shutter drive guide recess 10 in the direction of its thickness.

The cartridge body 4 has in combination therewith a shutter member 13 keeping the read/write openings 9 closed when the disc cartridge 1 is not used to prevent dust or foreign matter from coming into the cartridge body 4 through the read/write openings 9 to adhere to or scratching or otherwise damaging the optical disc 5. As shown in FIG. 5, the shutter member 13 consists of a pair of shutter portions 14 and 15 opposite and parallel to each other and a joint portion 16 joining the base portions of the shutter portions 14 and 15 to each other. Thus the shutter member 14 has a generally C cross section. The shutter member 14 is made of aluminum, for example.

As shown in FIG. 4, the shutter portions 14 and 15 are formed to have a rectangular shape having sufficient dimensions to cover the read/write openings 9. The joint portion 16 is designed to have a height somewhat larger than the thickness of the cartridge body 4, and has formed integrally therewith at opposite ends thereof a first sliding guide 17 and second sliding guide 18. The first and second sliding guides 17 are flush with each other. The first sliding guide 17 is further extended by a third sliding guide 19 as shown.

The sliding guides 17 and 18 are designed a little higher than the guide wall 11 and have a C-shaped cross section. The first sliding guide 17 has such a width in the moving direction of the shutter member 13 as to overlap by about 1.5 mm the guide wall 11a of the lower half 3 when the shutter member 13 closes the read/write openings 9. More particularly, with the allowance of the lower half 3 and a mis-matching between a shutter locking member 23 which will further be described later and the shutter member 13 taken in consideration, the first sliding guide 17 is designed to have such a minimum size that it will not disengage from the guide wall 11a.

The joint portion 16 has formed nearly in the center thereof an engagement hole 16a in which the shutter closing member 32 of the drive drive is to be engaged when the disc cartridge 1 is set in the cartridge loader of the disc drive.

Figure 6:
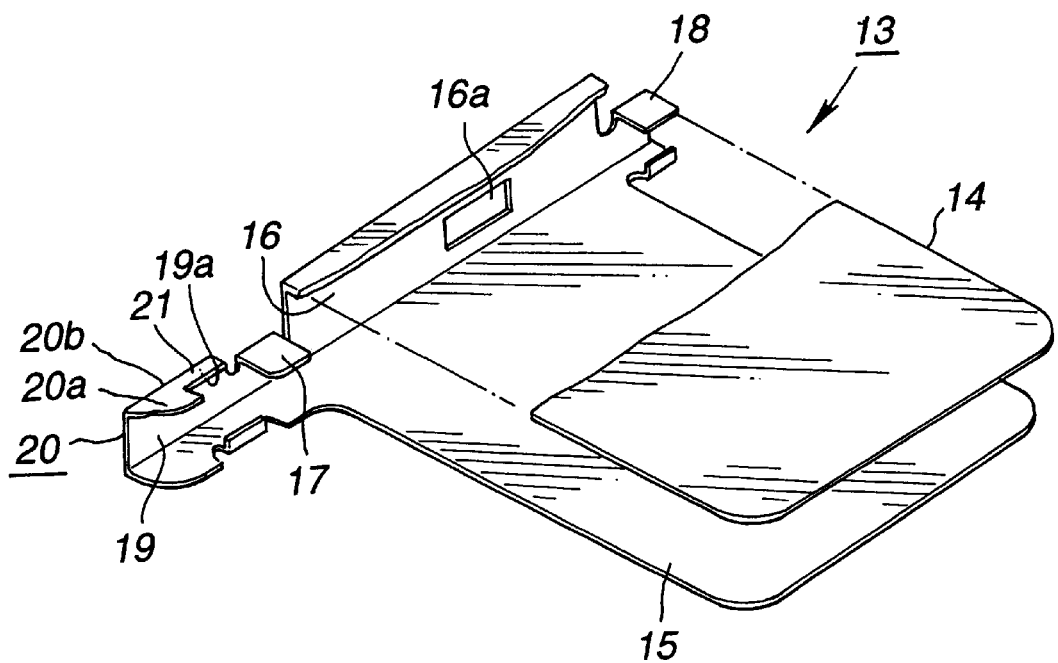
FIG. 6 is a partially fragmentary perspective view of the shutter member provided in the disc cartridge in FIG. 4.
Figure 7:
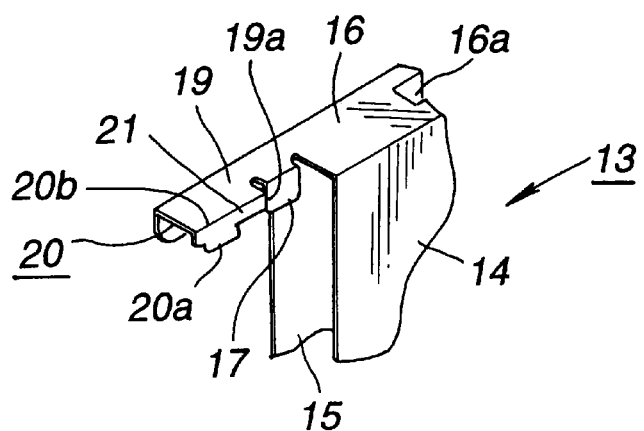
FIG. 7 is a perspective view of the essential portions of the engagement lug formed on the shutter member.

As shown in FIGS. 5 and 6, the third sliding guide 19 has formed at the side face of the joint portion 16 an engagement lug 20 which is to be engaged in an engagement concavity 19a of the shutter locking member 23 as will further be described later. The engagement lug 20 has a side end 20a thereof formed as a generally quarter of a circle. The engagement lug 20 is projected from the third sliding guide 19 so as to be engageable in the engagement concavity 25a of the shutter locking member 23.

The third sliding guide 19 has a reinforcing portion 21 bent along with the engagement lug 20. More particularly, when the engagement lug 20 is bent from the upper edge of the third sliding guide 19 of the shutter member 13, a base portion 20b of the third sliding guide 19, at which the bending is made, is extended towards the joint portion 16 widely in the sliding direction, thereby forming the reinforcing portion 21 integrally with the third sliding guide 19. Therefore, the reinforcing portion 21 is formed integrally with the engagement lug 20, the base portion 20b of the engagement lug 20 is formed wide in the sliding direction, and thus has an improved mechanical strength. The engagement lug 20 can be prevented from being bent inwardly by a shock, if any, applied to the disc cartridge 1 dropped by mistake. Note that the engagement lug 20 should preferably have the base portion 20b thereof formed more than 4.5 mm wide, which has been proved by the result of drop and impact test conducted on the disc cartridge according to the present invention.

When the shutter member 13 is installed to the cartridge body 4, the engagement lug 20 formed as in the above is inserted into the shutter opening guide recess 10 formed in the front face 33 of the cartridge body 4 and engaged in a shutter locking member 23 disposed inside the cartridge body 4 which will further be described later.

The shutter member 13 is assembled to the cartridge body 4 in such a manner that the first and second sliding guides 17 and 18 will catch, from both above and below, the guide wall 11 formed upright on the lower half 3. As the disc cartridge 1 is inserted into the cartridge loader of the disc drive, the shutter member 13 is slid along the cartridge body 4 to two positions: a closed position where the shutter portions 14 and 15 close the read/write openings 9 and an open position where the read/write openings 9 are opened.

The upper and lower halves 2 and 3 of the cartridge body 4 have formed on the main surfaces thereof shutter sliding concavities 22, respectively, extending from the longitudinal edge of the read/write opening 9 to the lateral edge of the cartridge body 4 and also from the inner end of the read/write opening 9 to the front face 33 of the cartridge body 4. Namely, the shutter sliding concavity 22 and read/write opening 9 cover together the sliding range of the shutter portions 14 (15). The sliding concavity 22 is deep nearly corresponding to the thickness of the shutter portion 14 (15). Thus, the shutter sliding concavities 22 permit to assemble the shutter member 13 to be flush with the upper and lower main surfaces of the cartridge body 4. Therefore, the disc cartridge 1 according to the present invention can avoid an increase in total thickness of the shutter member 3 assembled to the cartridge body 4.

The cartridge body 4 is provided with the shutter locking member 23 locking the shutter member 13 in the closed position where the shutter member 13 closes the read/write openings 9. The shutter locking member 23 is molded from a synthetic resin or the like and consists of a pivot portion 24, a locking arm portion 25 and an elastically deflectable portion 26 formed integrally with the pivot portion 24 and opposite to each other. The shutter locking member 23 has thus a generally U shape. The pivot portion 24 has formed in the base portion thereof a through-hole in which a pivot shaft 3a formed upright on the inner surface of the lower half 3 of the cartridge body 4 is inserted.

Figure 8:
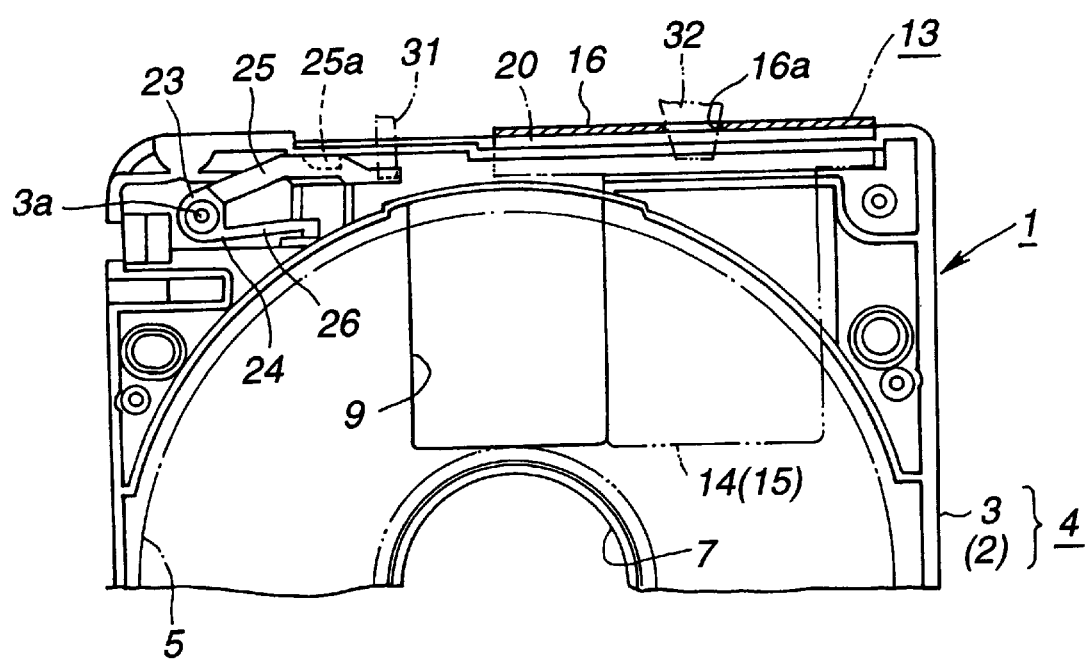
FIG. 8 is a plan view of the essential portions of the disc cartridge with the upper half removed.

As shown in FIG. 8, the locking arm portion 25 has an engagement concavity 25a formed on a side face thereof which will face the shutter drive guide recess 10 when the shutter locking member 23 is assembled to the cartridge body 4. When the shutter member 13 closes the read/write openings 9, the engagement lug 20 formed on the shutter member 13 is engaged in the engagement concavity 25a. Thereby, the shutter member 13 is kept locked by the shutter locking member 23 while the read/write openings 9 are closed by the shutter portions 14 and 15. When the shutter locking member 23 is assembled to the cartridge body 4, the elastically deflectable portion 26 is engaged at the free end thereof on the upright wall of the lower half 3 of the cartridge body 4.

The cartridge body 4 has disposed at a corner 1b thereof diagonal to a corner 1a where a support shaft 3a to support the shutter locking member 23 a member 27 for prevention of an erroneous recording. The erroneous recording preventive member 27 is molded from a synthetic resin or the like to have a generally E shape. When moved along the lower half 3 to a first position 28 or to a second position 29, the erroneous recording preventive member 27 closes or opens an erroneous recording detecting hole 30 formed in the lower half 3.

Therefore, in the disc cartridge 1 according to the present invention, when the erroneous recording preventive member 27 is placed at the first position 28 where it closes the erroneous recording detecting hole 30, an erroneous recording detecting means of the disc drive, for example, is blocked from entering the erroneous recording detecting hole 30 to enable write of information signal to the optical disc 5. When the member 27 is placed at the second position 29 where it opens the hole 30, the erroneous recording detecting means is allowed to enter the hole 30 to disable the write to the optical disc 5.

The disc cartridge 1 constructed as mentioned in the above is introduced in a direction indicated with an inserting direction mark provided on the upper surface of the cartridge body 4 into the cartridge loader with a cartridge holder disposed inside the disc drive. With this operation, the shutter opening member 31 of the disc drive is introduced from the open end 10a into the shutter drive guide recess 10 formed in the front face 33 of the cartridge body 4. As the disc cartridge 1 is further deep inserted into the cartridge loader, the shutter opening member 31 will ride onto the locking arm portion 25 of the shutter locking member 23 from the base end-side outer face towards the free end of the latter to press the locking arm portion 25 inwardly of the cartridge 4.

As the locking arm portion 25 is forced by the shutter opening member 31 inwardly of the cartridge body 4, the shutter locking member 23 is pivoted clockwise about the pivot portion 24 on the support shaft 3a as shown in FIG. 8. Pivoting of the shutter locking member 23 will disengage the engagement plug 20 of the shutter member 13 from the engagement concavity 25a of the shutter locking member 23, thus the shutter member 13 is allowed to move in relation to the cartridge body 4.

After thus released from the locked state by the shutter locking member 23, the shutter member 13 is slid, as the disc cartridge 1 is further inserted into the cartridge loader, the shutter member 13 is pressed by the shutter opening member 31 to slide in a direction for opening the read/write openings 9. The disc cartridge 1 has the read/write openings 9 in the cartridge body 4 released from the closure by the shutter portions 14 and 15 of the shutter member 13. When the shutter member 13 is slid until the read/write openings 9 are fully opened, the shutter locking member 23 is released from the pressing by the shutter opening member 31 to the locking arm portion 25. The shutter locking member 23 is pivoted counterclockwise about the pivot portion 24 until the engagement concavity 25a is opposite to the shutter drive guide recess 10 as shown in FIG. 8.

As the disc cartridge 1 is inserted into the cartridge loader of the disc driver, the shutter closing member 32 is put into abutment with the lateral side end of the first sliding guide portion 17 of the shutter member 13. The shutter closing member 32 is formed towards the front face 33 of the cartridge body 4 by an elastic means (not shown).

Thus, the shutter closing member 32 abutting the side end of the first sliding guide portion 17 is elastically caused to ride onto the surface of the first sliding guide portion 17. Immediately after the shutter closing member 32 is unlocked by the pressing of the locking arm portion 25 by the shutter opening member 31, its free end comes to a position corresponding to the engagement hole 16a in the shutter member 13 and is engaged into the engagement hole 16a under the elasticity of the elastic means. The shutter member 13 is kept to open the read/write openings 9 as the shutter closing member 32 is held engaged in the engagement hole 16a by the elastic means.

When an operation for ejection of the disc cartridge 1 after completion of signal write or read with respect to the optical disc 5, the disc cartridge 1 is removed from the cartridge loader of the disc drive. At this time, the shutter member 13 is moved in relation to the disc cartridge 4 since the shutter closing member 32 of the disc drive is engaged in the engagement hole 16a under the elasticity of the elastic means. The shutter portions 14 and 15 of the shutter member 13 is closing the read/write openings 9 of the cartridge body 4, which status is maintained by the shutter locking member 23.

For a reduced weight of the disc cartridge 1, the shutter member 13 is made of a thin aluminum sheet as mentioned above. The disc cartridge 1 can be produced with a less cost than the conventional disc cartridge 101 having the shutter member 107 made of a thin stainless steel sheet. In the disc cartridge 1, the engagement lug 20 has a somewhat lower mechanical strength than the engagement lug 107f of the shutter member 107 of the conventional disc cartridge 101 because of its material. To compensate for the low mechanical strength, the reinforcing portion 21 is formed integrally with the base portion 20b of the engagement lug 20 in the disc cartridge 1 to thereby improve the mechanical strength against breakage or bending caused by a shock, if applied, by dropping or otherwise handling of the disc cartridge 1. Thus the shutter member 13 can be positively kept locked. The disc cartridge 1 is designed lightweight by forming the shutter member 13 from a thin aluminum sheet and hence can be driven with a reduced operating force.

The present invention has been described in the foregoing concerning the disc cartridge 1 having the optical disc 5 spinnably encased in the cartridge body 4. However, the present invention is not limited only to this embodiment. The present invention may be applied widely to an other disc cartridges having spinnably encased therein a magneto-optical disc or a magnetic disc. In the aforementioned embodiment, the shutter member 13 is composed of the pair of shutter portions 14 and 15 and the joint portion 16. In case a read/write opening is formed only in one side of the cartridge body, however, one of the shutter portions serves as a guide.

Although the shutter member 13 in the aforementioned embodiment of the present invention is made of a thin aluminum sheet, a lighter and more inexpensive material than the material for the conventional shutter member such as synthetic resin, thin magnesium sheet or the like may of course be used to make the shutter member 13.

As having been described in the foregoing, in the disc cartridge according to the present invention, the reinforcing portion is formed integrally at the base portion of the engagement lug formed integrally with the shutter member and engaged on the shutter locking member to keep the shutter member in the closed position where it closes the read/write openings. Thus, the reinforcing portion improves the mechanical strength. Therefore, even when the disc cartridge is applied with a shock by careless dropping or other handling, the engagement lug can be prevented from being broken or bent to thereby permitting to positively protect the shutter member, so it is possible to positively prevent dust or foreign matter from coming into the disc cartridge through the read/write openings and adhering to or damaging the surface of the optical disc exposed in the read/write openings. Even if the shutter member of the disc cartridge is made of a thin aluminum sheet or the like, for example, which is inexpensive and light, its reliability can be assured to a sufficient extent. Therefore, the disc cartridge can be designed for a reduced weight and manufacturing cost. Also, the shutter member can be slid smoothly with a reduced operating force to two positions, closed and open, where the read/write openings are closed and opened, respectively.

What is claimed is:

1. A disc cartridge, comprising:
   a cartridge body having spinnably encased therein a disc-shaped recording medium and having also formed therein read/write openings through which portions of main surfaces of the disc-shaped recording medium are exposed;
   a shutter member coupled movably to the cartridge body and having:

shutter portions to cover the read/write openings;

a joint portion formed integrally with the shutter portions perpendicularly to the latter to be opposite to one lateral face of the cartridge body and having formed therein an engagement hole in which a shutter driving member of a recording/reproducing apparatus; and a sliding guide portion formed integrally with one lateral edge of the joint portion and having an engagement lug formed by bending parallel to the shutter portions, the engagement lug having a base; and a locking member disposed inside the cartridge body so as to engage with the engagement lug of the engagement lug with the shutter portions positioned to close the read/write openings, thereby locking the shutter member;

the shutter member having formed integrally therewith a reinforcement portion bent along with the sliding guide portion to reinforce the base of the engagement lug and thereby preventing the engagement lug from being bent inwardly by a shock applied to the disc cartridge.

2. The disc cartridge as set forth in claim 1, wherein the shutter member is made of aluminum.

* * * * *